Nov. 4, 1958  F. D. MARASSO  2,858,775
DOUGH HANDLING MACHINE
Filed Aug. 11, 1954  5 Sheets-Sheet 1

INVENTOR
FRED D. MARASSO
BY Bradley Cohn
ATTORNEY

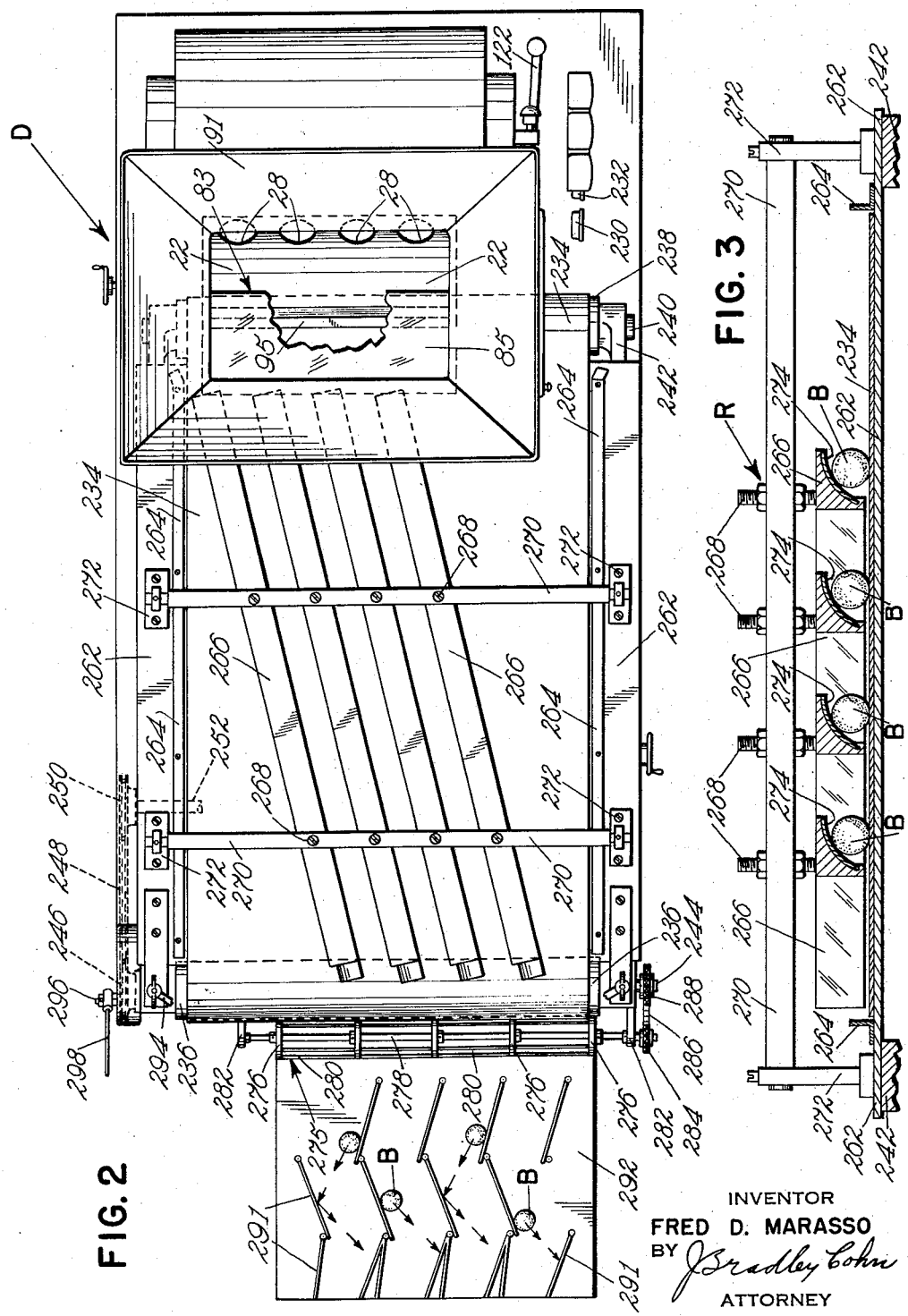

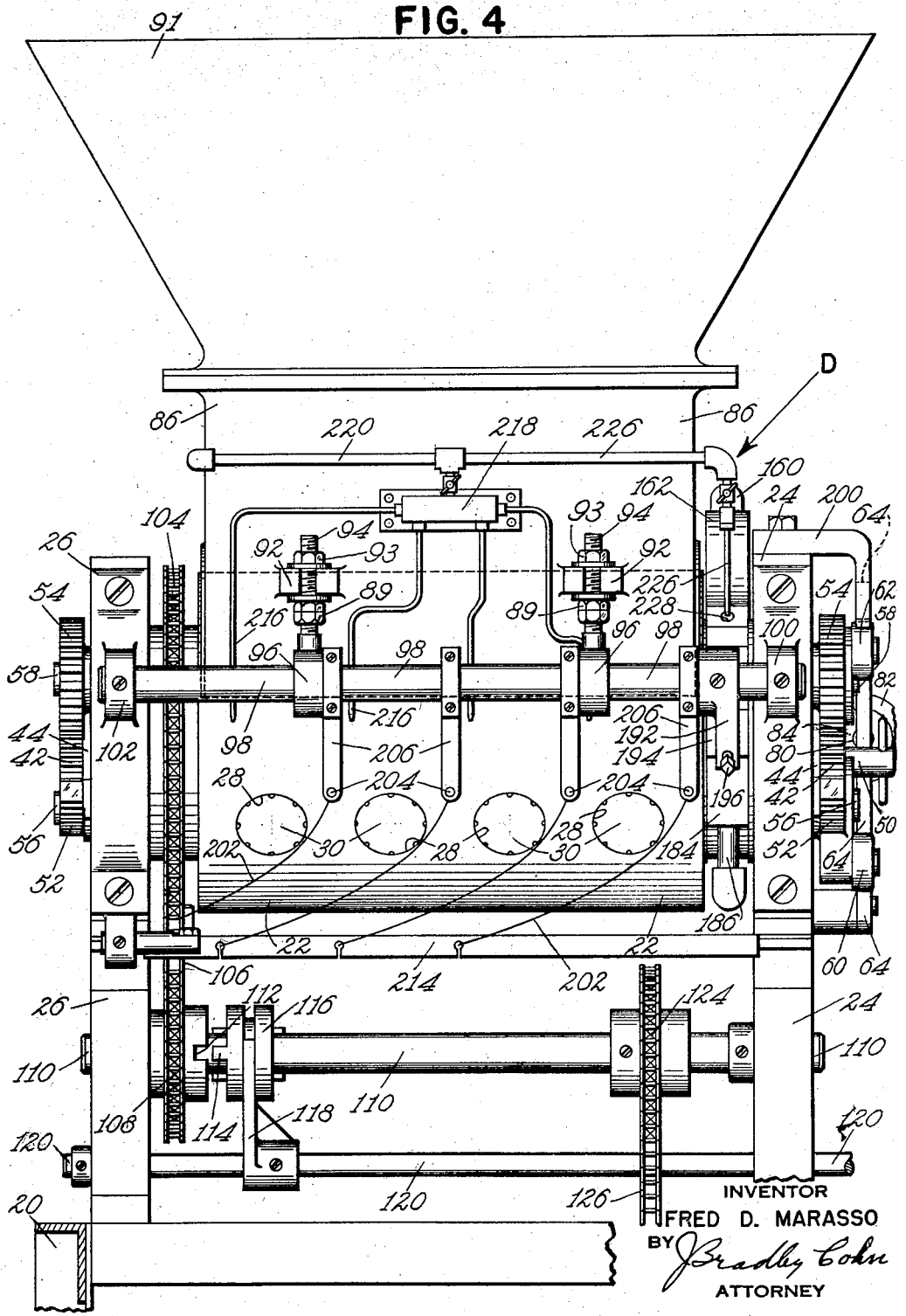

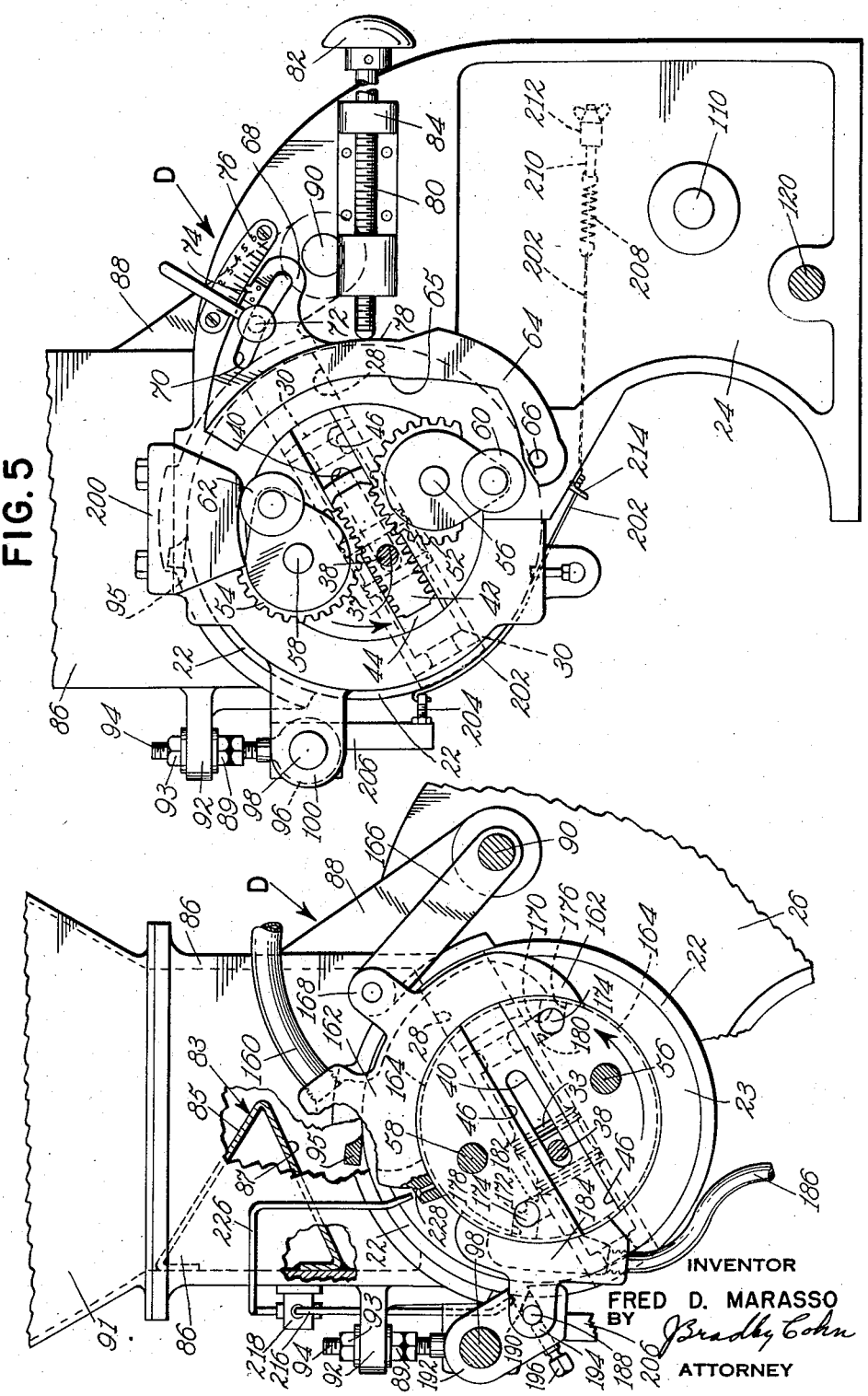

Nov. 4, 1958  F. D. MARASSO  2,858,775
DOUGH HANDLING MACHINE
Filed Aug. 11, 1954  5 Sheets-Sheet 5
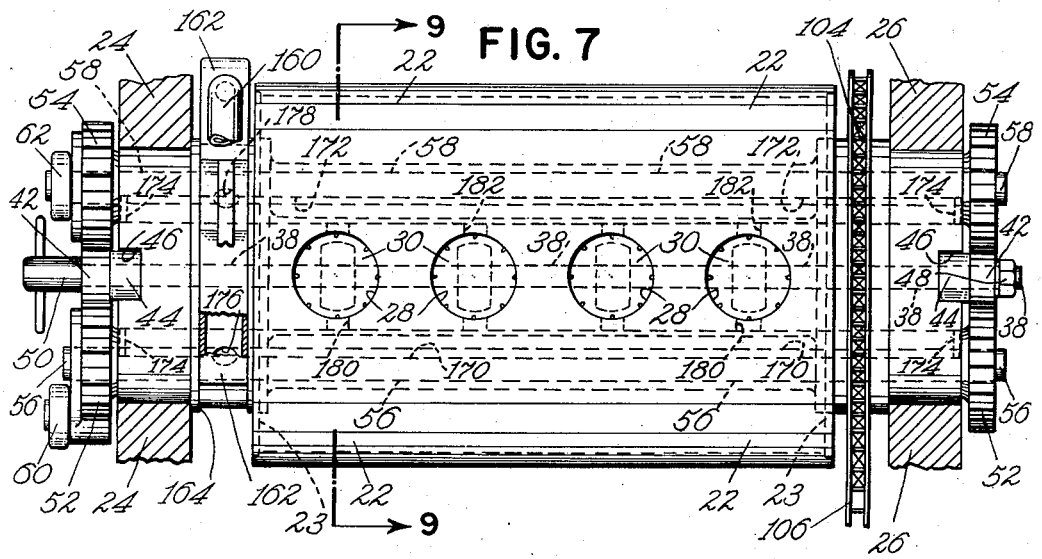
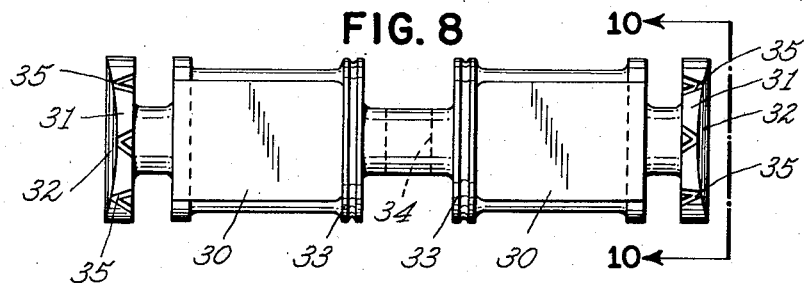
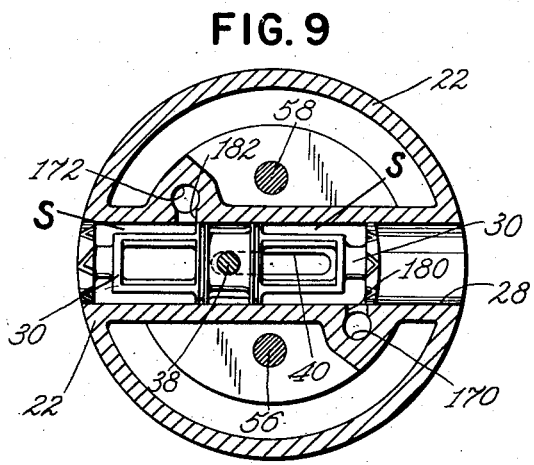
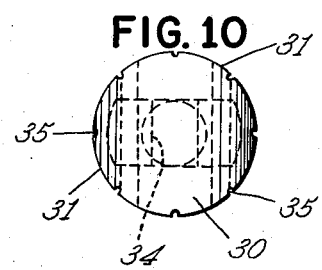
INVENTOR
FRED D. MARASSO
BY
ATTORNEY United States Patent Office 2,858,775
Patented Nov. 4, 1958

2,858,775

DOUGH HANDLING MACHINE

Fred D. Marasso, Joliet, Ill., assignor, by mesne assignments, to American Machine & Foundry Company, New York, N. Y., a corporation of New Jersey Application August 11, 1954, Serial No. 449,090

16 Claims. (Cl. 107—15)

This invention relates to machines for handling plastic material, particularly dough, and more particularly for dividing such material into volumetrically scaled portions and to rounding such portions, as in the case of dough. My invention partially relates to an improved construction for scaling the dough in cylinders and for the means of operating and controlling the metering and ejecting action of the pistons.

It is an object of my invention to provide means for accurately metering a predetermined amount of dough by means of a double acting piston reciprocating in a diametral cylinder of a rotating drum and more particularly to operating a plurality of such pistons simultaneously and from the same control means and to round the dough lumps while maintaining the regimented files issuing from the rotating drum.

It is a further object of my invention to design a simple control means for the metering pistons.

It is still another object of my invention to design a single adjustable cam means readily movable to control the metering for a selected quantity of dough.

In furtherance of my invention, I have devised a simplified adjustable stationary cam which may be accurately adjusted to control the metering depth of the piston in the cylinder without affecting the discharge or extruding stroke of the piston.

It is a further object of my invention to provide a simplified but effective rounding means in conjunction with my divider by which the positive timing is maintained during all operations on the dough.

It is still a further object of my invention to provide a combined machine that will deliver at regular time intervals a row of scaled and rounded dough balls.

The novel features which I believe to be characteristic of my invention are set forth with particularity in the appended claims. My invention itself, however, both as to its organization and method of operation may be understood by reference to the following description taken in connection with the accompanying drawings, in which:

Fig. 2 is a plan view of the same, taken on line 2—2 of Fig. 1;

Fig. 3 is a sectional end elevation of the rounder portion of the machine, taken on line 3—3 of Fig. 1;

Fig. 4 is an end elevation of the vacuum divider, taken on line 4—4 of Fig. 1;

Fig. 5 is a detailed side elevation of the same illustrating the adjustable control cam for piston displacement to meter cylinder volume;

Fig. 6 is a sectional side elevation of the divider illustrating the vacuum system in connection with the dough carrying cylinder;

Fig. 7 is a detailed side elevation of the dividing cylinder with a multiple piston arrangement;

Fig. 8 is a detailed side elevation of a single two-ended piston;

Fig. 9 is a sectional end elevation of the dividing cylinder, taken on line 9—9 of Fig. 7, and Fig. 10 is an end elevation of a piston taken on line 10—10 of Fig. 8.

Figure 1:
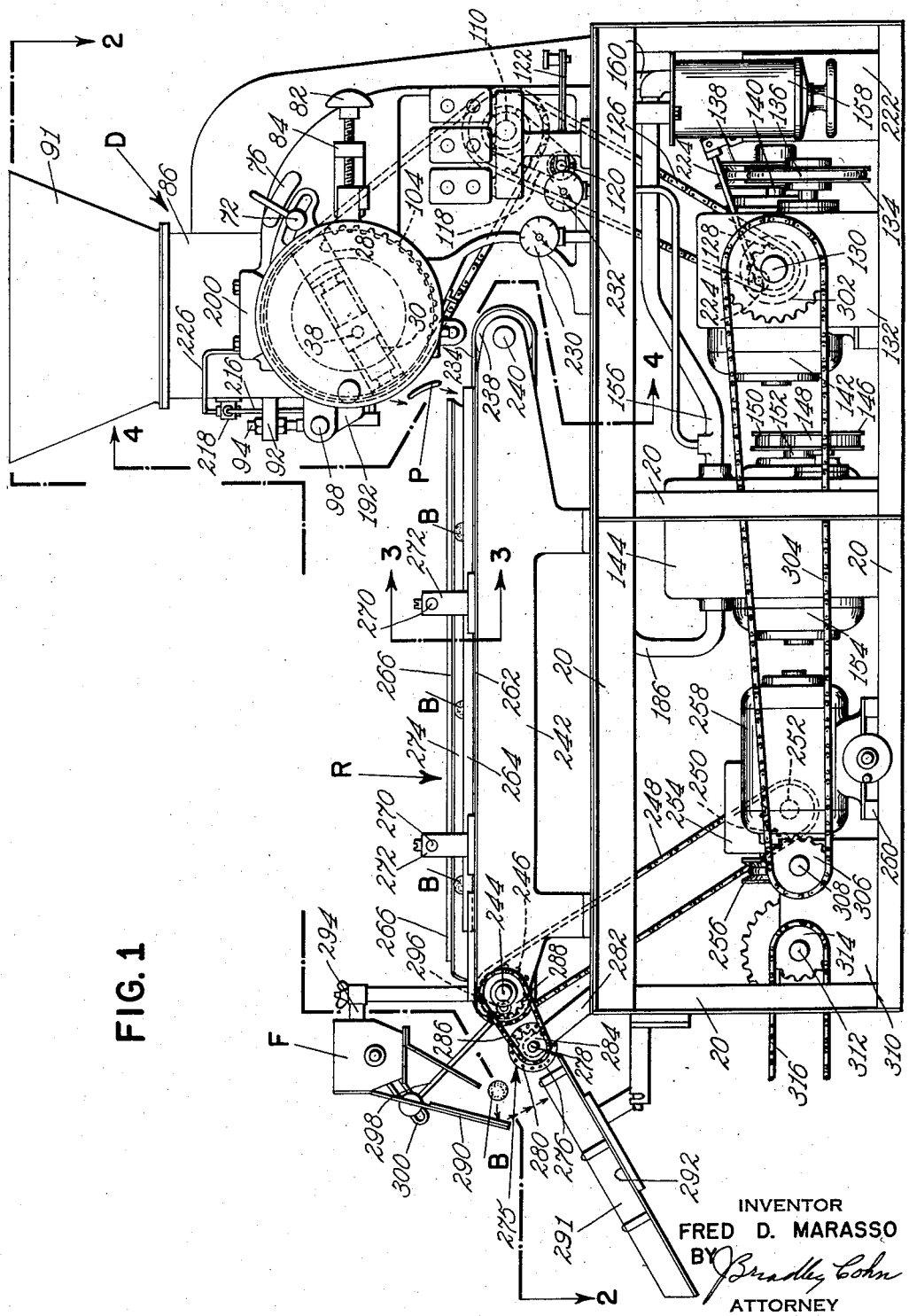
Fig. 1 is a side elevation of the vacuum divider and rounder.

With reference to the drawings, the vacuum divider and rounder consist of a dough dividing apparatus D and a dough rounding device R both of which are mounted on and supported by a suitable and common frame structure 20 (Fig. 1).

The divider D consists of a cylinder or drum 22 horizontally supported at each end by bearings in vertical frame brackets 24 and 26, respectively, secured to the top portion of frame structure 20. Drum 22 has a plurality of equally spaced diametral bores or cylinders 28 each provided with a reciprocating two-ended piston 30. Each piston end 32 is curved to a radius corresponding to the radius of the periphery of drum 22. Pistons 30 are shorter in length than the outside diameter of the drum.

Each piston has a central hole or bore 34 through which passes a horizontal connecting shaft 38. Each end of shaft 38 protrudes through a suitable guide slot 40 in each end wall 23 of drum 22. Each end of shaft 38 protrudes through a suitable guide slot 40 in each end wall 23 of drum 22. Each end of shaft 38 passes through a bore 37 in a double gear rack 42 (Fig. 5) integral with or suitably secured on a guide plate 44. Each guide plate 44 is slidably supported in a track 46 formed in the outer face of each end wall 23 of drum 22. Shaft 38 is secured at one end (Fig. 7) by a nut 48 and at the other end by a detachable handle 50 employed to keep guide plates 44 in engagement with their tracks 46. This permits quick disassembling of the unit for cleaning.

Each gear rack 42 at each end of drum 22 engages with two gear segments 52 and 54, respectively (Figs. 5 and 7), arranged opposite each other and in such a manner that each gear segment engages with one side of double gear rack 42 (Fig. 5). Gear segments 52 are secured to each end of a horizontal shaft 56 which protrudes through each end of drum 22 and is rotatably supported in bearings of end walls 23. Gear segments 54 are similarly mounted on a similar shaft 58. Cam rollers 60 and 62 are pivotally mounted on gear segments 52 and 54, respectively, at one end of drum 22.

During rotation of drum 22, these rollers successively engage an arc-shaped cam bar 64 (Fig. 5), pivotally secured to a stud shaft 66 held by vertical frame bracket 24. The upper end of cam bar 64 has a lug 68 having an arcuate slot 70 engaged by a clamp screw 72 in the upper portion of frame bracket 24. Lug 68 also carries a pointer 74 which indicates positions of cam bar 64 on a scale 76 on frame bracket 24. The back edge 78 of cam bar 64 is also engaged by a horizontal supporting and adjusting spindle 80 having a hand knob 82. Spindle 80 is in threaded engagement with a bracket 84 secured to frame bracket 24.

Cam bar 64 has formed thereon a cam surface or metering edge 65. This surface 65 is formed on an arc centered about the axis of drum 22 when the cam bar 65 is moved fully to the right (Fig. 5). This arc is then positioned so that cam rollers 60 ride on surface 65 until the upper end of cylinders 28 passes beyond the point of communication with the dough in the hopper. This position with cam bar 65 full to the right (Fig. 5) is the maximum volume dough scaling position. When the cam is moved fully to the left (minimum or zero scaling point), the arc 65 is not centered on the axis of drum 22 and the roller 60 rides off it, just as the upper end of cylinder 28 loses contact with the dough mass in the hopper. This same condition prevails with intermediate setting of cam bar 65.

A dough hopper 86 loosely rests on and covers an upper portion of drum 22. Hopper 86 is hinged at its rear by a pair of lugs 88 (Figs. 5 and 6) engaging a horizontal transverse shaft 90 secured at each end by brackets 24 and 26. The front of hopper 86 is adjustably held by adjustable lock nuts 89 and nuts 93 which engage a pair of fork-shaped lugs 92 on hopper 86. The nuts are threaded on a stud 94 carried by a collar 96 loosely supported on a transverse shaft 98 in lugs 100 and 102 (Fig. 4) of frame brackets 24 and 26, respectively. By adjustment of lock nuts 89, hopper 86 may be properly seated on the surface of drum 22. The assembly may be quickly dismantled for cleaning by loosening nuts 93 and swinging studs 94 on their collars 96 out of engagement with lugs 92. Funnel 91 is secured to the top flanges of hopper 86 to increase its capacity.

The drum is rotated through its sprocket 104 (Figs. 1, 4 and 7) driven by a chain 106 from a sprocket 108 (Fig. 4) loosely mounted on a transverse shaft 110 supported in a suitable bearing in frame brackets 24 and 26. The hub of sprocket 108 has a clutch face 112 driven by a complementary face 114 of a clutch collar 116 slidably keyed to the continuously rotating shaft 110. Clutch collar 116 loosely engages a forked arm of an actuating lug 118 secured to a horizontal rod 120 slidingly supported by frame brackets 24 and 26. One end of rod 120 carries a hand lever 122 (Fig. 1) for moving rod 120 to open and close clutch 112, 114. Continuously rotating shaft 110 is driven by sprocket 124 and chain 126 from sprocket 128 mounted on a shaft 130 of a gear reduction unit 132 (Fig. 1).

Gear reduction unit 132 through a pulley 134 and belt 136 is driven from a Reeves type pulley 138 mounted on a motor shaft 140 of a motor 142 adjustably secured to the lower portion of the frame structure 20.

A vacuum pump 144 (Fig. 1) mounted on frame 20 is driven through a pulley 146 and a belt 148 from a pulley 150 mounted on a shaft 152 of a motor 154 on frame 20. The vacuum side of pump 144 is connected by a tube 156, filter 158 and tube 160 to a suction housing or chamber 162 whose open face (opening) is seated in a U-shaped annular groove 164 provided in the outer periphery of one of the stepped down ends of drum 22. Chamber 162 is held in position by a link 166 (Fig. 6) pivoted on a lug 168 of housing 162 and loosely anchored to transverse shaft 90. Drum 22 has two diametrically opposed transverse ducts 170 and 172 running the entire length of the drum but sealed off at each end by plugs 174 (Fig. 7). Ducts 170 and 172 communicate with annular groove 164 by ports 176 and 178, respectively. Each duct 170 and 172 further has an opening or passageway 180 and 182, respectively, to each of radial cylinders 28 as illustrated in Figs. 6, 7 and 9.

The exhaust or pressure side of vacuum pump 144 is similarly connected at the bottom to annular groove 164 of drum 22 by housing 184 and tube 186 (Figs. 6 and 1). Housing 184 is firmly held in contact with groove 164 by a stud shaft 188 (Fig. 6) engaging an angular slot 190 of a lug 192 suspended from transverse shaft 98. Stud shaft 188 is held by a forked lug 194 on the top of housing 184. A set screw 196 threaded through lug 192 contacts stud shaft 188 to secure housing 184 against movement and to provide adjustment.

As clearly shown in Figs. 9, 6, 5 and 1, pistons 30 have heads 31 at each end and are shorter than cylinders 28. The center portion of each piston is provided with a pair of spaced narrow piston flanges 33 arranged so two separate air spaces S exist between seal flanges 33 and the corresponding piston heads 31 at each end of the piston. Grooves 35 are formed on the periphery of each head 31 to permit passage of air to the top 32 as illustrated in Fig. 8. These grooves 35 are preferably formed in a V-shape as illustrated in Figs. 8 and 9. With this formation the chances of any hole being blocked with dough particles is reduced. Thus, if one branch of the V groove does become blocked the other can carry the air flow through the hole at the apex of the V.

Dividing

The hopper 86 is filled with dough and the drum 22 rotated by the described drive means engaging sprocket 104. The top ends of cylinders 28 in revolving drum 22 engage the dough at the bottom of hopper 86 as the pistons are in retracted (downward) position. Vacuum is applied to these top cylinders 28 through duct 170 (172), opening 180 (182) and grooves 35 to draw the dough down into the cylinders. The dough in the hopper is forced down by gravity and atmospheric pressure. If desired, for unusually stiff dough, the hopper may be closed and pressurized. As drum 22 continues to rotate, cam roller 60 of gear segment 52 contacts the metering edge 65 of cam bar 64. This action rotates gear segments 52 clockwise moving gear rack 42 and the connected pistons (shaft 38) upward to a predetermined metering position established by edge 65 of cam 64. Thus the action is to fill the cylinders with a surplus volume and then force out the excess. Each cylinder then carries the predetermined volume established by the setting of cam bar 65.

A shearing bar or knife 95 positioned across the hopper with its cutting edge in contact with the upper surface of drum 22 severs the dough mass in the hopper from the dough in the cylinders. This prevents the dough mass in the hopper from drawing the dough from metering cylinders 28 during rotation of drum 22. It also tends to prevent drum 22 from rolling or rotating the dough mass in hopper 86.

In addition to knife 95, there is in hopper 86 a baffle 83 having a dough supporting surface 85 and a dough compressing surface 87. Surface 85 bears most of the weight of the dough in hopper 86 and funnel 91. This tends to equalize the weight bearing on the dough in metering cylinders 28 thus securing a uniform density to improve the accuracy of the volumetric scaling. For example, if the dough at cylinders 28 is compressed due to hopper 86 and funnel 91 being full, the dough pieces P will because of their greater density contain more dough than they would toward the end of a run when the dough level in the hopper is low. This would necessitate changing the scaling volume during a run. However, I have found that the baffle 83 by supporting almost the entire weight of the adhesive dough mass above it, prevents this condition and gives uniform scaling throughout a run.

Bottom surface 87 of baffle 83 has a twofold action. (1) It tends to compress the dough against drum 22 to hold the metered dough in the pocket or cylinder 28. (2) Its baffling action prevents rotation or churning of the dough mass in hopper 86 with the consequent circulation or return of first fed dough to the surface. Thus, the dough is uniformly consumed by cylinders 28 from hopper 86 and funnel 91.

As drum 22 continues its rotation, the dough filled cylinders leave hopper 88 and then pistons 30 move to extrude the dough from the cylinders. This motion is caused by cam roller 60 of gear segment 52 contacting a stationary discharge cam 200, secured to frame bracket 24 (Fig. 5) causing a further clockwise turning of gear segment 52 resulting now in a downward (outward) motion of gear rack 42 and consequently of pistons 30. This motion is sufficient to bring the top 32 of heads 31 flush with the periphery of drum 22. The discharge of the dough from the cylinders is furthermore abetted by air pressure now applied from pressure head 194 through ducts 170 (172) and passages 182. The vacuum to the same duct 170 (172), of course, was cut off long before as the port 176 moved away from the open face of vacuum chamber 162.

The application of air pressure not only aids the discharge of dough but also clears grooves 35 in the piston heads as well as all other vacuum ports, spaces, ducts and passageways in the pistons and drum. Adherence of dough to the top 32 of pistons 31 is prevented by a plurality of stationary wire strands 202 which sweep the periphery of the drum 22 during its rotation through the discharge piston (Figs. 4 and 5). Each wire is anchored to a stud 204 held by a bracket 206 clamped to shaft 98. The other end of the wire 202 is hooked to a tension spring 208 (Fig. 5) held by an adjustable stud 210 supported by a cross bar 212 mounted between frame brackets 24 and 26. To hold the wires 202 in their angular position a guide bar 214 having suitable slots may be provided (Fig. 4).

Since the pistons are two headed, the one end is ready to receive dough from the hopper just after the other end discharges its dough (Figs. 5, 6 and 7). The ports 176 and 178 alternately pass under pressure and vacuum heads 162 and 194 in proper timing.

Lubrication of dough contacting surfaces

The dough contacting surfaces of the pistons and drum are lubricated by open ended oil tubes 216 connected to a distributor 218 secured to the front wall of hopper 88. Distributor 218 is supplied by a tube 220 (Fig. 4) leading from a Bijour type pump connected to an oil sump 222 (Fig. 1). The pump is driven by a crank arm 224 attached to shaft 130 of reduction gear unit 132. Annular groove 164 and the tubings and portings of the drum and pistons are lubricated by tube 226 leading from the distributor 218 to an opening 228 in the trailing flange and seating surface of suction housing 162. This oil thereby is deposited in groove 164 and also into ports 176 and 178 as they pass toward the pressure chamber 194. The oil in ports 176 and 178 as they pass toward the pressure chamber 194. The oil in ports 176 and 178 is blown through all ducts and ports of the drum and pistons. This cleans the system of small dough particles that may have been drawn in during the vacuum cycle. The oil in groove 164 passes around the drum to lubricate and seal the contact surfaces of pressure and vacuum housings 162 and 194. Pressure gauge 230 and vacuum gauge 232 provide a check on the system.

Rounding

As the dough pieces P (Fig. 1) are discharged from the cylinders, they fall onto a conveyor belt 234 of the dough rounding device R (Figs. 1, 2 and 3). Belt 234 is led over continuously driven pulley 236 and an idler pulley 238 mounted on a horizontal shaft 240 supported in bearings of a frame 242 secured to the top portion of frame structure 20 of the machine. The driven pulley 236 is mounted on a shaft 244 also supported in suitable bearings of frame 242.

Shaft 244 carries a sprocket 246 driven by a chain 248 from a sprocket 250 secured on a shaft 252 protruding from a gear reduction unit 254 (Fig. 1) mounted on the bottom portion of frame structure 20. The gear reduction unit 254 is driven through means of a spring-loaded Reeves drive type pulley 256 by a motor 258 adjustably secured to suitable guide bars 260 attached to the frame structure 20.

The upper run of the conveyor belt 234 is supported by means of a table plate 262 secured to the top portion of frame 242. On each side of the belt 234 guide rails 264 are provided to prevent the belt from walking.

A plurality of spaced rounding boards or bars 266 are positioned above belt 234. These members 266 have concave sides toward the belt. They run approximately the full length of the upper run of belt 234 and are arranged angularly with respect to the running direction of the belt as illustrated in Fig. 2. Rounding bars 266 are held by adjustable studs 268 suspended from a pair of supporting rods 270 secured at each end to a bracket 272 fastened on table plate 262. The concave face or side of each rounding board is provided with a lining or coating 274 to rotate and round dough pieces conveyed by belt 234. I prefer a Teflon coating 274 to which the dough will not adhere. The angularity of the board provides sufficient contact to knead and rotate the dough lumps on belt 234 and to draw a skin about the lump. The rounding boards 266 correspond in number to the cylinders in drum 22. The transverse rolling movement imparted to the disc-shaped dough pieces P by the angular attitude of the boards 266 rounds them into dough balls B without disturbing the spaced files delivered by drum 22. The timing or speed is likewise maintained during the rounding. Balls B are stripped off the delivery end of conveyor belt 234 by a revolving squirrel cage 275. Squirrel cage 275 consists of a plurality of spaced discs 276 (Fig. 2) mounted on a horizontal shaft 278 and supporting spaced transverse rods 280 at their periphery. Shaft 278 is supported by bearing brackets 282 secured to the frame structure 20. The shaft is driven by sprocket 284 and chain 286 from sprocket 288 on conveyor belt drive shaft 244. I have found that best results are obtained if the cage 275 is constructed to have a peripheral speed higher than belt 234.

The balls B after they leave cage 275 are guided by deflector plate 290 (Fig. 1) to a chute 292 leading to trays or pans (not shown). Flour from a duster F falls on the upper end of chute 292. Plate 290 prevents dough balls B from hurling this portion of chute 292 due to the impetus given balls B by squirrel cage 275.

In order to completely flour balls B as they travel down chute 292, baffles or guide plates 291 are provided to define a zig-zag course. This course (see arrows Fig. 2) rolls all portions of balls B in the flour.

The flour duster F is adjustably held by a bracket 294 on frame 242 to sprinkle flour onto the dough balls B and upper part of chute 295. The arm 300 (Fig. 1) of the agitator in duster F is reciprocated by link 298 on crank pin 296 on sprocket 246.

This divider-rounder has a driven chain 316 from sprocket 314 of gear unit 310 driven by chain 304 from sprocket 302 on shaft 130 of the main gear reduction unit 132. Chain 314 is provided for synchronizing my divider-rounder with any other machine as, for example, a proofing machine or automatic panner.

I claim:
1. In a machine for handling dough, a rotating drum, a row of spaced diametral bores formed in said drum and in a single plane, a two-headed piston reciprocably mounted in each of said bores in said drum, each of said pistons having a piston flange mounted between the heads of said piston to define with the walls of said bores a separate inner chamber behind each head, said piston heads when in retracted position forming an outer open-ended chamber defined by the top of said piston heads and the boundaries of said bores, a passage formed in said drum substantially parallel the axis thereof and communicating the inner chambers formed behind the heads at one end of said pistons with each other, a second passage formed in said drum substantially parallel the axis thereof and communicating the inner chambers formed behind the other heads of said pistons with each other, each of said passages having a port communicating with the exterior of said drum, a shaft connecting said pistons and mounted in said drum to move diametrally in said drum in a plane parallel to said cylinders in a direction transverse the axis of said shaft, a rack connected to at least one end of said shaft, a gear sector pivotally mounted on the end of said drum and engaging said rack, a cam follower mounted on said gear sector, an adjustable cam track positioned to engage said cam follower to rotate said gear sector to reciprocate said rack whereby said pistons may be reciprocated in said cylinder during the rotation of said drum, said cam track being adjustable to vary the extent of movement of said pistons, a stationary vacuum hood engaging said drum and so posi- tioned to engage at predetermined times during rotation of said drum the ports communicating with one group of inner chambers, and a pressure hood positioned to engage said drum and communicate with one of said passage ports at a different predetermined point in rotation, said piston heads having openings formed therein communicating with said outer chambers and said inner chambers whereby air flow from said vacuum and pressure heads may selectively vacuumize or pressurize said outer chambers through said passages and said inner chambers.

2. In a machine for handling dough, a rotating drum, a row of spaced diametral bores formed in said drum and in a single plane, a two-headed piston reciprocably mounted in each of said bores in said drum, a shaft connecting said pistons and mounted in said drum to move substantially diametrally in said drum in a plane parallel to the longitudinal axes of said cylinders, a rack connected to one end of said shaft and slidably mounted in said drum to move in a path parallel to said pistons, a gear sector pivotally mounted on the end of said drum and engaging said rack, a cam follower mounted on said gear sector, and an adjustable cam track positioned to engage said cam follower during rotation of said drum to rotate said gear sector to reciprocate said rack and said shaft whereby said pistons may be reciprocated in said cylinder during the rotation of said drum, said cam track being adjustable to vary the reciprocation of said pistons.

3. In a dough handling machine, a mechanism for controlling the reciprocation of a metering piston, a drum mounted for rotation, said drum having a diametral cylindrical bore formed therein, a double headed piston mounted in said cylindrical bore for reciprocation therein, slide means at one end of said drum oriented in a plane parallel to the axis of said formed diametral cylindrical bore, a double gear rack secured to said slide, a pair of gear sectors rotatably mounted on said end of said drum on each side of said gear rack and engaging therewith, cam followers on said gear sectors, a stationary cam positioned adjacent said end of said drum to engage said cam followers one at a time to rotate said gear sectors in one direction to move said gear rack in said slide means, said other gear sector rotating freely in an opposite direction, a second adjustable stationary cam positioned about said drum substantially opposite to said first-named cam to subsequently during the rotation of said drum engage the cam follower on said other gear sector to rotate it a small predetermined amount in a counter-direction to move said slide means in said gear rack a small predetermined amount backward, said adjustable cam means being adjustable to vary said predetermined amount, and means to connect said slide means to said double-headed piston.

4. In a dough handling machine having a rotary drum and a scaling piston movable in said drum transversely of the longitudinal axis thereof, means operative to move said piston to a dough receiving position, a metering position and a discharge position, said means including a reciprocating double-sided gear rack, a connecting member connecting said gear rack to said piston, a pair of gear sectors pivotally secured to said drum and engaging said gear rack, one gear sector engaging one side of said gear rack and the other gear sector engaging the other side of said gear rack, cam followers mounted on said gear sectors to rotate said gear sectors on their pivot point, a stationary cam positioned to engage said cam followers during rotation of said drum to move said piston fully in one direction, and a second adjustable stationary cam positioned to move said piston a lesser predetermined adjustable amount in opposite direction.

5. In a machine for handling dough, a rotating drum, said drum having a diametrical bore formed therein, a two-headed piston reciprocably mounted in said bore, a piston-like flange mounted therebetween in spaced relationship to the heads of said piston to define with the walls of said bore and each of said heads a separate inner chamber behind each head, said piston heads when in retracted position in said bore forming an outer open ended chamber defined by the top of said piston heads and said bore, said drum having an externally communicating port on its surface, a passage in said drum communicating with one of said inner chambers adjacent one head of said piston, said drum having a second similar port and passage communicating with said other inner chamber behind said other head of said piston, a stationary pressure head in contact with a portion of the surface of said drum so as to be in communication with each of said ports at predetermined different times during the rotation of said drum, and a stationary vacuum head positioned in contact with another portion of said drum so as to be in communication with said ports at different predetermined times during the rotation of said drum so that on rotation of said drum the chambers behind said piston heads may be vacuumized at a predetermined time in the rotation of said drum and said chambers may be pressurized at a different predetermined time in the rotation of said drum, and said heads having openings formed therein to communicate said inner chamber with said outer chamber to correspondingly vacuumize and pressurize said outer chamber during rotation of said drum.

6. In a machine substantially as set forth in claim 5, further characterized in that the openings in said piston heads are formed so that each of said openings communicating with said outer chamber communicates by at least two passages to said inner chamber so that substantially the same effective pressure and vacuum respectively may be applied to said outer chambers should one of said pair of passages be obstructed.

7. In a machine substantially as set forth in claim 5, further characterized in that the openings in said piston head are formed as peripheral V-shaped grooves in said piston head, the apex of said V being toward the top of said piston head so that substantially the same effective pressure and vacuum respectively may be applied to said outer chambers should a leg of said V-shaped groove be obstructed.

8. A dough handling machine with a rotary drum, a scaling piston movable in said drum transversely of the longitudinal axis thereof, means operative to reciprocate said piston, said means including slide means at one end of said drum oriented parallel to the movement of said piston, a gear rack movably mounted in said slide, a gear sector rotatably mounted on said end of said drum to engage said gear rack, a cam follower on said gear sector, and an adjustable stationary cam positioned about said end of said drum to engage said cam follower to rotate said gear sector in a predetermined manner to reciprocate said gear rack and with it said piston during the rotation of said drum.

9. In a dough divider having a rotary drum and a reciprocating metering piston in said drum transversely of the longitudinal axis thereof, means for determining a varying metering movement of said piston in said drum comprising, a slide mounted on the end of said drum in a plane parallel to the movement of said piston, a double-sided gear rack mounted for movement along said slide, said rack being connected to said piston to move therewith, a pair of gear segments pivotally secured at the ends of said drum one on each side of said rack to engage and move said rack in said slide, a pair of cam rollers secured to said gear sectors, and a stationary cam positioned about said end of said drum to be engaged by said cam rollers to move said gear sector in a predetermined pattern, at least one portion of said cam being adjustably movable to vary the pattern of movement of said gear rack.

10. In a dividing machine having a rotary drum and a reciprocating metering piston in said drum transversely of the longitudinal axis thereof, means to control the movement of said piston comprising, a double-sided gear rack slidably mounted on the end of said drum to slide transversely across the end of said drum parallel to the movement of said piston, said rack being connected to said piston so said piston moves therewith, a pair of oppositely positioned gear sectors pivotally mounted at the end of said drum to engage said rack, whereby right hand rotation of one of said gear sectors will move said rack in one direction and rotate said other gear sector in a left hand direction, cam followers on said gear sectors, a stationary cam secured about a portion of one end of said drum to engage said cam rollers one at a time to rotate said gear sector in one direction, said other gear sector rotating in the opposite direction, and an adjustable cam about an opposite portion of said end of said drum to subsequently engage said other gear section and rotate it in said first-named direction to move said gear rack to a predetermined metering position, said predetermined position being determined by said adjustable cam.

11. In a mechanism having a rotary drum and a piston operatively mounted to reciprocate in said drum transversely of the longitudinal axis thereof, means to reciprocate said piston in a predetermined pattern during rotation of said drum, said means comprising a double-sided rack operatively connected to said piston and mounted on the end of said drum to move parallel to said piston, a pair of oppositely positioned gear sectors pivoted on said drum and each engaging an opposite side of said rack, a cam follower mounted on each of said gear sectors, and a stationary cam mounted about said end of said drum to engage and guide said cam followers during rotation of said drum to move said gear sectors to reciprocate said rack, whereby upon rotation of said drum said piston is moved transversely therein in a pattern predetermined by said stationary cam.

12. In a device substantially as set forth in claim 11, further characterized in that at least a portion of said cam is adjustable to vary the motion of said piston.

13. In a mechanism having a rotary drum and a piston operatively mounted to reciprocate in said drum transversely of the longitudinal axis thereof, a double-sided rack secured to said piston, a pair of oppositely positioned pivoted gear sectors each in engagement with a different side of said rack, cam followers on each of said gear sectors, a stationary cam mounted to engage said cam followers during the rotation of said drum to move said gear sectors to reciprocate said rack and said piston in a manner predetermined by the shape of said cam.

14. In a device substantially as set forth in claim 13, further characterized in that at least a portion of said cam is adjustable to vary the motion of said piston.

15. In a machine having a rotary drum and a piston opratively mounted to reciprocate in said drum transversely of the longitudinal axis thereof, mechanism to move said piston from a starting position during the rotation of said drum, said mechanism including a rack secured to said piston, a gear sector pivoted on said drum and in engagement with said rack, a cam follower on said gear sector, a stationary cam positioned to engage said gear sector during the rotation of said drum to move said gear rack in one direction in a motion established by said cam, and means to return said gear sector and said rack to said starting position.

16. In a device substantially as set forth in claim 13, further characterized in that at least a portion of said cam is adjustable to vary the motion of said piston.

References Cited in the file of this patent

UNITED STATES PATENTS

| | | |
|---|---|---|
| 1,337,152 | Peters | Apr. 13, 1920 |
| 1,652,325 | Pletscher | Dec. 13, 1927 |
| 1,793,981 | Westcott et al. | Feb. 24, 1931 |
| 1,893,845 | Schiff | Jan. 10, 1933 |
| 2,119,018 | Marasso | May 31, 1938 |
| 2,178,406 | Rhodes | Oct. 31, 1939 |

OTHER REFERENCES

Publication: "2 Men Can Do the Work of 6," by Automatic Moulder Co., Portland, Oregon, September 10, 1929, 2 pages.